Aug. 18, 1959 C. E. CREDE ET AL 2,900,162
RESILIENT SUPPORT
Original Filed Jan. 17, 1955 2 Sheets-Sheet 1
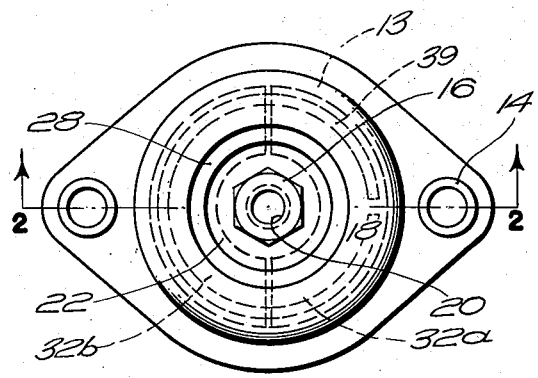
FIG. 1
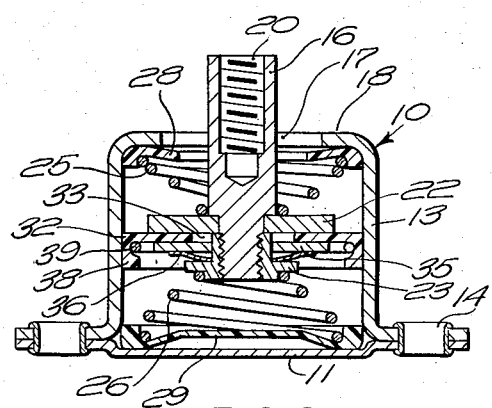
FIG. 2
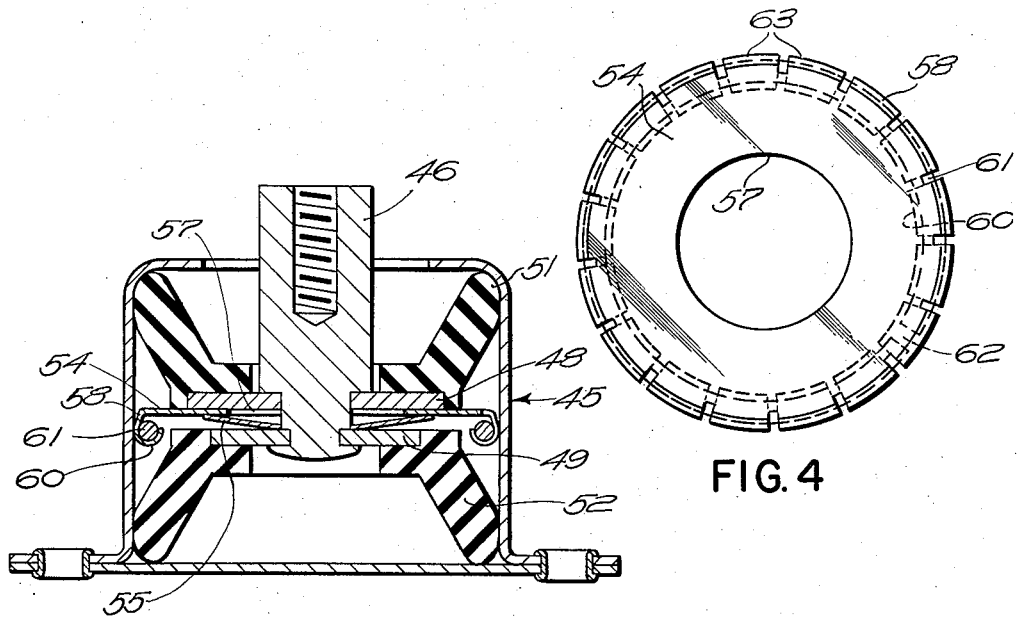
FIG. 3
FIG. 4
INVENTORS
CHARLES E. CREDE
BERTRAND S. FURBECK
BY
Dike, Thompson & Sanborn
ATTORNEYS Aug. 18, 1959   C. E. CREDE ET AL   2,900,162
RESILIENT SUPPORT
Original Filed Jan. 17, 1955   2 Sheets-Sheet 2

INVENTORS
CHARLES E. CREDE
BERTRAND S. FURBECK
BY
Dike, Thompson & Sanborn
ATTORNEYS United States Patent Office 2,900,162
Patented Aug. 18, 1959

2,900,162

RESILIENT SUPPORT

Charles E. Crede, Pasadena, Calif., and Bertrand S. Furbeck, Littleton, Mass., assignors to Barry Controls Incorporated, Watertown, Mass., a corporation of Massachusetts Continuation of application Serial No. 482,272, January 17, 1955. This application December 19, 1958, Serial No. 781,753

12 Claims. (Cl. 248—358)

This invention relates to resilient supports and, more particularly, to vibration isolators. A vibration isolator is a device to reduce the magnitude of vibration as it is transmitted from one structure to another. The vibration whose magnitude is reduced may be either a vibratory motion or a vibratory force. Vibration isolators are commonly used to support engines, pumps, and other apparatus to prevent the transmission of force from such equipment to the structure which supports it. Vibration isolators are also used to mount delicate equipment in aircraft, vehicles, ships, industrial plants and the like to protect such equipment from the vibratory motion existing where the equipment is used.

The principal elements of a vibration isolator are resilient means for supporting the load, and damping means for dissipating energy to prevent the vibration amplitude from becoming excessively great. It is difficult to combine both of these functions in a single mechanical element. In certain types of vibration isolators, it is convenient to employ a coil spring for supporting the load. The stiffness of such a spring may be carefully controlled and predetermined to accomplish the desired function. Such a spring generally is undamped, and a separate energy dissipating means or damper must be used in conjunction with the coil spring to attain optimum characteristics for the vibration isolator.

It is an object of this invention to construct the spring and damper from materials which are substantially unaffected by extremes of temperature and other environmental conditions. Isolators are frequently used in military aircraft and in other locations wherein extreme temperatures exist, and it is desirable that the operation of the isolators be independent of environmental conditions insofar as possible.

Another object of this invention is to provide an isolator which is capable of providing vibration isolation when installed in any position or attitude. Many types of isolators, which have been and are in common use, are adapted to operate only when the equipment is supported upon a horizontal surface and when the isolators are located underneath the mounted equipment. The maneuvering ability of certain types of military aircraft require that isolators operate properly when the mounting surface is horizontal, vertical or inclined, and when the isolators are below, above or beside the mounted equipment.

Another object of this invetnion is to provide a damped isolator in which the damping is effective for all directions of motion, whether such motion is in the vertical or horizontal direction. A still further object is to provide damping whose effectiveness may be adjusted at will, independently of other characteristics of the isolator, and in which the damping in the vertical and horizontal directions may be adjusted to different values if desired.

A further object of this invention is to provide a vibration isolator in which the spring and damping forces remain substantially unaffected when the mounted equipment experiences an appreciable displacement. In certain applications of isolators on equipment mounted in rockets and guided missiles, a substantially constant value of acceleration is sustained for a relatively long time. The effect of this acceleration upon the mass of the mounted equipment simulates the application of a steady force to the isolator and causes a steady displacement thereof. It is desirable that the resilient load supporting element remain operative during these conditions to afford vibration isolation and that the damper continue to function to prevent the occurrence of random vibration.

A still further object of this invention is to provide a damped vibration isolator of a design which can be constructed in a variety of sizes and shapes. Substantially the same characteristics can thus be attained, regardless of the size of the isolator and the weight of the mounted equipment.

Other objects and advantages of the invention will be apparent to persons skilled in the art from the following description and the accompanying drawings in which:

Fig. 1 is a top plan view of a preferred embodiment of this invention.

Fig. 2 is a section on line 2—2 of Fig. 1.

Fig. 3 is a vertical section similar to Fig. 2 of another embodiment of the invention.

Fig. 4 is a top plan view of one of the elements of the damper of the isolator of Fig. 3.

Figure 5:
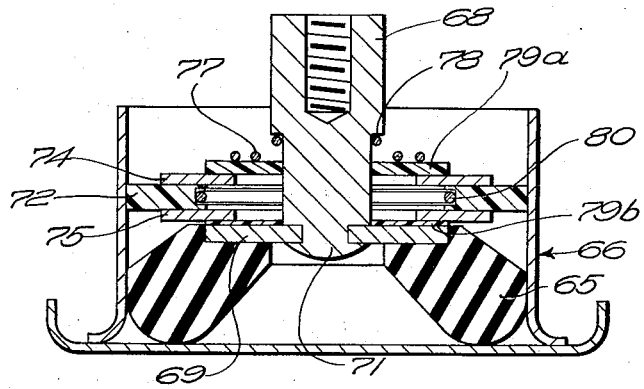
Figs. 5, 6 and 7 are sectional views similar to Fig. 2 illustrating three other embodiments of the invention.

In the embodiment of the invention illustrated in Figs. 1 and 2, the resilient support or isolator comprises a base member or housing 10 consisting of a plate-like bottom 11 and an inverted cylindrical cup-like member 13. The bottom plate 11 and the cup 13 are secured together by hollow eyelets 14, the isolator being adapted for mounting to a structure by inserting screws, bolts, or rivets through the hollow eyelets 14.

The load attachment member is a post 16 which, in the embodiment shown, extends through an opening 17 in the top wall 18 of the inverted cup 13, and is provided with a tapped hole 20 for ready attachment of the supported load by means of a bolt (not shown). Spaced rigid washer parts 22, 23 are rigidly secured to the load attachment member 16 toward the end thereof which is disposed within the housing. Opposed conical springs 25 and 26 are inserted with their small ends engaging said washer parts 22 and 23 respectively and their large ends constrained by the housing as will be hereinafter described.

The top wall 18 and bottom plate 11 of the housing 10 are fitted with annular snubbing members 28, 29 in the form of plates bulged inwardly from the walls of the housing 10 towards the vertical centerline thereof. These snubbing members are interposed between the top and bottom walls of the housing and the conical springs 25 and 26. The snubbing members 28, 29 are preferably formed from material having a relatively low modulus of elasticity, such as nylon, so that they may deflect and serve as a resilient cushioning means. The low modulus provides a relatively low stiffness, and the curvature makes possible a gradual increase in stiffness and gradual bottoming upon application of an excessively large vertical force against the face which bulges inwardly.

With the conical springs 25, 26 installed as illustrated in Fig. 2, each spring is partially compressed and nests snugly against the load attachment member 16 and one of the snubbing members 28 and 29 which engage the housing 10. This arrangement of springs thus permits a load to be applied to the member 16 vertically downward, vertically upward, or laterally and to be resisted by the spring forces. With such an arrangement of springs, the isolators may be installed underneath the mounted equipment between it and a horizontal floor, between the mounted equipment and a vertical wall, or between the mounted equipment and an overhead structure. The isolators of this embodiment are thus adapted to withstand a load applied in any direction or in any combination of directions.

The damping element 32 whose outside diameter is approximately equal to but slightly less than the inside diameter of the cylindrical cup 13 of the housing 10 is interposed between the washer parts 22, 23 which are carried by the load attachment member 16. The damping element 32 is provided with a central aperture 33 the diameter of which is substantially greater than the outside diameter of the load attachment member 16 at the portion of said member which is located between the washer parts 22 and 23. The thickness of the damping element 32 at its central portion is substantially less than the distance between the washer parts 22 and 23. The space between the damping element 32 and the washer part 23 is occupied by a friction washer 35 preferably engaging the lower surface of the damping element 32 and a spring washer 36 interposed between the washer 35 and the washer part 23 to resiliently urge the washer 35 against the lower face of the damping element 32. Inasmuch as lateral movement of the damping element 32 is constrained because its periphery engages the cylindrical wall 13 of the housing 10, sliding occurs between the damping element 32 and the washer 35 and the washer part 22 when the load attachment member 16 moves laterally with respect to the housing 10. The friction between the lower face of the damping element 32 and the washer 35 and between its upper face and the washer part 22 oppose lateral movement of the load attachment member 16, and provides damping for vibration in a mode which embodies such lateral movement. The magnitude of this friction force is conveniently adjusted by modifying the characteristics of the spring washer 36.

The peripheral part of the damping element 32 includes a peripheral flange 38 which, in the embodiment illustrated in Fig. 2, extends downwardly from the main body of the damping element. The flange 38 is formed with a re-entrant angle or groove in which is nested a spring 39 consisting of a single broken coil the ends of which are spaced apart slightly when the damper is in operative position as shown in dotted lines in Fig. 1. The tension of the spring 39 is such as to force the damping element 32 outwardly against the cylindrical wall 13 of the housing 10. The damping element 32 is divided into segments along one or more diameters and the segments thereof thus are forced outwardly laterally against the wall 13 of the housing 10 in response to the outward force exerted by the spring 39. The damping element shown in Figs. 1 and 2 is divided into two segments 32a and 32b along a single diameter as shown in dotted lines in Fig. 1.

The damping element 32 is included between the spaced washer parts 22, 23 of the load attachment member 16 and consequently experiences a vertical movement within the housing 10 when the load attachment member 16 moves vertically relative to the housing. The friction of the periphery of the damping element 32 rubbing on the cylindrical housing wall 13 introduces a damping force which is effective in damping any vibration whose mode includes vertical movement of the load attachment member 16 relative to the housing 10 of the isolator. The magnitude of this damping force may be adjusted by changing the characteristics of the spring 39. These characteristics may be modified independently of the characteristics of the spring washer 36 which determine the magnitude of the damping force for horizontal vibration. One acceptable material of which the damping element 32 may be made is nylon but it also may be made of any material or materials having suitable friction characteristics.

In the embodiment shown in Figs. 3 and 4, the housing 45 and the load attachment member 46 are generally similar to those heretofore described with reference to Figs. 1 and 2. The lower end of the load attachment member 46 is provided with spaced rigid washer parts 48, 49 which respectively engage conical rubber springs 51, 52, disposed generally in the manner of the metal springs 25, 26 illustrated in Fig. 2. The damping element 54 in the embodiment shown in Figs. 3 and 4, is in contact with the lower face of the rigid part 48 carried by the load attachment member 46 and is held in contact therewith by a spring washer 55 interposed between the damping element 54 and the lower rigid part 49. The rigid parts 48, 49 are preferably bonded or otherwise adhered to the rubber springs 51, 52 respectively. The damping element 54 is provided with a relatively large aperture 57 at its central portion so that the load attachment member 46 can move laterally with respect to the damping element 54.

The peripheral part of the damping element 54 is provided with a downwardly turned flange 58 having an inwardly turned rim 60 which provides a groove to contain the single spring coil 61 the ends of which are separated at 62 as shown in Fig. 4. As shown in Fig. 4 the flange 58 and rim 60 are slotted at numerous places around the periphery of the damper so that the segments 63 of the flange and rim between the slots extend from slightly inside the edge of the top or disc-like member outwardly, downwardly and inwardly to the inner edge of the rim 60 forming a plurality of parallel spring fingers 63 which are urged outwardly against the side wall of the housing 45 by the spring 61, thereby causing a friction force when the load attachment member 46 is moved vertically with respect to the housing. The horizontal and vertical damping forces are thus achieved in a manner similar to that heretofore described with respect to the embodiment of Figs. 1 and 2 and can be varied independently as desired. The damper 54 is preferably made of metal but other materials may be used.

The embodiment illustrated in Fig. 5 employs a single rubber spring 65 located in the lower part of the housing 66 and arranged to support the load attachment member 68. The rubber spring 65 includes a washer 69 which is preferably bonded or adhered thereto, and which is secured to the lower end of the load attachment member 68 by the headed-over portion 71. The damping element 72 is in the form of a washer divided into segments along one or more diameters (see the segments 32a and 32b of Fig. 1) which are confined between two friction washers 74, 75. The friction washers 74, 75 are forced against the opposite faces of the damping element 72 by the conical spring 77 which encircles the load attachment member 68. Its upper end seats against the shoulder 78 of the load attachment member and its lower end seats upon the nylon washer 79a which loosely encircles the load attachment member and rests upon the washer 74. Another nylon washer 79b is interposed between the washer 69 and the washer 75. The friction between the washers 74, 75 and the damping element 72 provides damping for horizontal motion of the load attachment member 68 relative to the housing 66. The inner surface of the damping element 72 is formed with an inwardly facing groove in which nests a single coil spring 80 arranged to force the segments of the damping element 72 outwardly against the cylindrical wall of the housing 66, thereby providing the friction force required to damp vibration embodying vertical motion.

Figure 6:
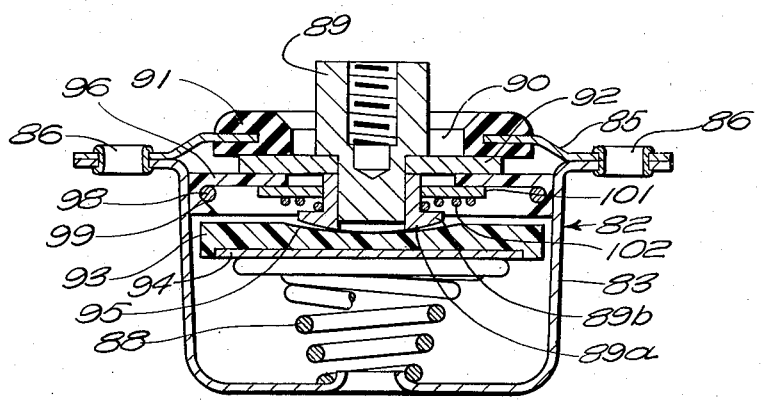

In the embodiment illustrated in Fig. 6, the housing 82 is comprised of a lower cup 83 and an upper plate 85 secured together by hollow eyelets 86. A single conical spring 88 disposed in the lower part of the housing 82 is the resilient load-carrying means. A load attachment member 89 extends downwardly through an opening 90 in the upper plate 85 and includes a rigid washer 92 securely fastened thereto. The outside diameter of the washer 92 is greater than the diameter of the opening 90 in the plate 85, thereby captivating the load attachment member 89 within the housing 82. A rubber grommet 91 is mounted in the opening 90 of the upper plate 85 to act as a snubber.

The lower end of the load attachment member 89 is supported upon the nylon member 93 which is supported on the metal disc 94 interposed between the member 93 and the conical spring 88. The central part of the upper surface of the member 93 is formed with a substantially spherical cavity or seat 95 in which the lower substantially spherical end 89a of the load attachment member 89 rests. The outside diameter of the member 93 is slightly smaller than the inside diameter of the housing 82 so that excessive lateral movement of the member 93 relative to the housing wall 83 is prevented but vertical movement relative to the wall 83 is permitted.

The damping element 96 used in the embodiment shown in Fig. 6 is similar to that illustrated in Figs. 1 and 2 and includes a similar spring 98 of a single coil nested in the re-entrant angle or groove 99 and adapted to force the segments of the damping element 96 outwardly into frictional engagement with the cylindrical wall 83 of the housing 82. The load attachment member 89 slidably carries a friction washer 101 located directly below the damping element 96 and forced against the damping element 96 by the conical spring 102, the lower end of which is seated on the top surface of the flange 89b of the load attachment member 89. The damping force in the vertical and horizontal directions may thus be adjusted independently by varying the characteristics of the springs 98 and 102, respectively. The spherical cavity or seat 95 in the member 93 and the spherical end 89a of the load attachment member 89 cooperate to provide a horizontally directed force which urges the member 89 toward the center of the housing 82 when it becomes displaced therefrom. The load attachment member 89 is preferably constructed of metal to achieve the required strength while the member 93 is preferably constructed of nylon or other material adapted to resist wear when acted upon by the sliding motion of the spherical end 89a of the load attachment member 89.

Figure 7:
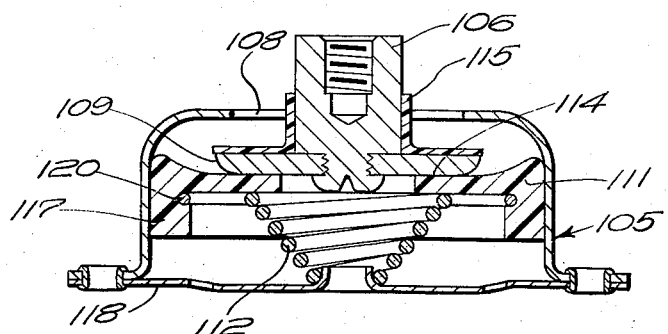

The embodiment shown in Fig. 7 includes a housing 105 similar to the housings of the embodiments illustrated in Figs. 2 and 3. A load attachment member 106 extends through an opening 108 in the top of the housing and carries on its lower end a washer 109 rigidly secured thereto. The washer 109 is supported by a damping element 111 which may be made of nylon. The damping element 111 and the load attachment member 106 are supported by the inverted conical spring 112 interposed between the damping element 111 and the bottom wall 118 of the housing 105. The upper face of the damping element 111 and the lower face of the washer 109 are formed with mating, substantially spherical surfaces 114. The conical spring 112 thus provides a resilient load supporting means, and the spherical surfaces 114 contribute a horizontal restoring force or a horizontal spring effect in a manner similar to that described with reference to the elements 89a and 95 of Fig. 5. Excessive movement of the load attachment member 106 in upward and lateral directions is snubbed by the relatively compliant nylon sleeve 115 inserted over the load attachment member 106. Excessive movement in a downward direction is snubbed by engagement of the depending flange 117 of the damping element 111 with the bottom wall 118 of the housing 105.

The depending peripheral flange 117 of the damping element 111 is formed with a re-entrant angle or groove and the coil spring 120, comprised of a single coil as in Figs. 1 and 2 is nested within this groove or re-entrant angle. The damping element 111 is divided along one or more diameters to form segments similar to the segments 32a and 32b of Fig. 1 to permit the spring 120 to urge these segments of the damping element outwardly against the cylindrical wall of the housing 105, thereby causing friction which damps vertical vibration. Damping for horizontal vibration is derived from friction between the washer 109 and the damping element 111 at the spherical interface 114.

Although several embodiments of the invention have been shown and described, it is to be understood that this disclosure is for the purpose of illustration and that various changes and modifications may be made without departing from the spirit and scope of the invention as set forth in the appended claims.

This application is a continuation of application Serial No. 482,272, filed January 17, 1955, now abandoned.

We claim:

1. A vibration isolator comprising a supporting member and a supported member, means located between said members for resiliently supporting one on the other, one of said members comprising a housing having a wall extending in one direction, said housing having an opening, the other member extending in said one direction through said opening into said housing, the edge of said opening being spaced from said other member in a direction lateral to said one direction, said other member and said housing being movable with respect to each other in said one direction and said lateral direction, said other member having a pair of shoulders at least one of which has a surface extending in said lateral direction, a damping element movable with said other member and with respect to said housing in said one direction and movable with said housing and with respect to said other member in said lateral direction, said damping element having an opening therethrough through which said other member extends, the edge of said damper opening being spaced from said other member, a first resilient element biased between said damping element and the other of said shoulders for urging said damping element in said one direction into damping relationship with said surface of said shoulder to frictionally damp movement of said other member and said housing with respect to each other in said lateral direction and to force said damping element to move with said other member and with respect to said housing in said one direction and a second resilient element for resiliently urging said damping element in said lateral direction into damping relationship with said wall to frictionally damp movement of said other member and said housing with respect to each other in said one direction and to force said damping element to move with said housing and with respect to said other member in said lateral direction.

2. A vibration isolator according to claim 1, said damping element comprising a plurality of segments.

3. A vibration isolator according to claim 1, said means for resiliently supporting one member on the other comprising two springs located within the housing on opposite sides of said damping element, one of the ends of both springs being movable with said other member in said lateral direction, said springs acting in opposite directions against said other member, the other ends of said springs acting respectively against the opposite ends of said housing, said springs being partially compressed axially at least in the normal loaded position of said other member.

4. A vibration isolator according to claim 1, said means for resiliently supporting one member on the other comprising two substantially conical springs located within the housing, said conical springs being arranged with their smaller ends movable with said other members in said lateral directions, said springs acting in opposite directions against said other member and the larger ends of said springs acting respectively against the opposite ends of said housing, said springs being partially compressed axially at least in the normal loaded position of said other member.

5. A vibration isolator according to claim 4 wherein the larger ends of said springs are constrained against movement in said lateral direction with respect to the side wall of the housing.

6. A vibration isolator comprising a supporting member and a supported member, means located between said members for resiliently supporting one on the other; one of said members comprising a housing having a wall extending in one direction, said housing having an opening, the other member extending in said one direction through said opening into said housing, the edge of said opening being spaced from said other member in a direction lateral to said one direction, said other member and said housing being movable with respect to each other in said one direction and said lateral direction, said other member having a pair of shoulders at least one of which has a surface extending in said lateral direction, said other member having a portion connecting said shoulders, a damping element movable with said other member and with respect to said housing in said one direction and movable with said housing and with respect to said other member in said lateral direction, said damping element being spaced in said lateral direction from said portion of said other member, a first resilient element biased between said damping element and the other of said shoulders for urging said damping element in said one direction into damping relationship with said surface of said shoulder to frictionally damp movement of said other member and said housing with respect to each other in said lateral direction and to force said damping element to move with said other member and with respect to said housing in said one direction and a second resilient element for resiliently urging said damping element in said lateral direction into damping relationship with said wall to frictionally damp movement of said other member and said housing with respect to each other in said one direction and to force said damping element to move with said housing and with respect to said other member in said lateral direction.

7. A vibration isolator comprising a supporting member and a supported member, one of said members comprising a housing having a wall extending in one direction, an opening in an end of said housing, the other member extending in said one direction through said opening into said housing, the edge of said opening being spaced from said other member in a direction lateral to said one direction, said other member and said housing being movable with respect to each other in said one direction and in said lateral direction, said other member having a surface extending substantially in said lateral direction, a damping element movable with said other member and with respect to said housing in said one direction and movable with said housing and with respect to said other member in said lateral direction, a first resilient element biased between said damping element and said housing for resiliently supporting one of said members on the other and for urging said damping element in said one direction into damping relationship with said lateral surface to frictionally damp movement of said other member and said housing with respect to each other in said lateral direction and to force said damping element to move with said other member and with respect ot said housing in said one direction, said damping element being located between said first resilient element and said lateral surface and said first resilient element being located between said housing and said damping element, said other member being resiliently supported in said housing by said first resilient element acting between said lateral surface and said housing through said damping element, said other member and hence said lateral surface being slidable in said lateral direction with respect to said damping element, and a second resilient element for resiliently urging said damping element in said lateral direction into damping relationship with said housing wall to frictionally damp movement of said other member and said housing with respect to each other in said one direction and to force said damping element to move with said housing wall and with respect to said other member in said lateral direction.

8. A vibration isolator according to claim 7 wherein said first resilient element acts between said other member and the end of said housing opposite said opening.

9. A vibration isolator according to claim 7, said damping element comprising a plurality of segments extending in said lateral direction, the peripheral portions of said segments comprising flanges extending in said one direction, said second resilient element being biased against said flanges.

10. In a vibration isolator, supporting and supported members, said supporting member comprising a housing having a wall extending in a vertical direction, said housing having an opening in the top thereof, said supported member extending in a vertical direction into said opening and being spaced laterally from the edge of said opening and from said housing wall, a horizontal damper, a load supporting resilient element interposed and acting between said damper and said housing, said damper being supported by said load supporting resilient element, said supported member having a lateral surface and being supported upon an upwardly facing surface of said damper and slidable thereon horizontally, said surface of said damper being forced upwardly into damping relationship with said lateral surface of said supported member by said load supporting resilient element.

11. An isolator according to claim 10, also comprising a second resilient element for urging said damper in a horizontal direction into damping relationship with said vertical wall of said housing.

12. A vibration isolator comprising a supporting member and a supported member resiliently supported on said supporting member, one of said members comprising a housing having a wall extending in one direction, said housing having an opening, the other member extending in said one direction through said opening into said housing, the edge of said opening being spaced from said other member in a direction lateral to said one direction, said other member and said housing being movable with respect to each other in said one direction and said lateral direction, said other member having a surface extending in said lateral direction, a damping element movable with said other member and with respect to said housing in said one direction and movable with said housing and with respect to said other member in said lateral direction, a first resilient element biased between said damping element and at least one of said other member and said housing for urging said damping element in said one direction into damping relationship with said lateral surface to frictionally damp movement of said other member and said housing with respect to each other in said lateral direction and to force said damping element to move with said other member and with respect to said housing in said one direction and a second resilient element for resiliently urging said damping element in said lateral direction into damping relationship with said wall to frictionally damp movement of said other member and said housing with respect to each other in said one direction and to force said damping element to move with said housing and with respect to said other member in said lateral direction.

References Cited in the file of this patent

UNITED STATES PATENTS

| | | |
|---|---|---|
| 1,802,589 | Thompson | Apr. 28, 1931 |
| 1,983,522 | Coultas | Dec. 11, 1934 |
| 2,365,989 | Ailes | Dec. 26, 1944 |
| 2,432,050 | Thiry | Dec. 2, 1947 |
| 2,683,015 | Campbell | July 6, 1954 |
| 2,683,016 | Campbell | July 6, 1954 |
| 2,705,606 | Triplett | Apr. 5, 1955 |
| 2,751,179 | Oravec | June 19, 1956 |